United States Patent [19]

McKelvey et al.

[11] 4,441,909

[45] Apr. 10, 1984

[54] APPARATUS FOR CURVING AND TEMPERING GLASS SHEETS

[75] Inventors: Harold E. McKelvey, Plymouth; William T. Livingston, Farmington Hills; Edward D. Sheldon, Detroit, all of Mich.

[73] Assignee: Shatterproof Glass Corporation, Detroit, Mich.

[21] Appl. No.: 391,573

[22] Filed: Jun. 24, 1982

[51] Int. Cl.³ .................. C03B 23/03; C03B 35/14
[52] U.S. Cl. .................................... 65/273; 65/286; 65/348
[58] Field of Search ............... 65/104, 106, 245, 273, 65/286, 348, 351

[56] References Cited

U.S. PATENT DOCUMENTS 3,265,484 8/1966 Ritter, Jr. ........................... 65/104
4,318,728 3/1982 Claassen .............................. 65/106

*Primary Examiner*—Arthur D. Kellogg
*Attorney, Agent, or Firm*—William E. Nobbe

[57] ABSTRACT

Apparatus for curving and tempering glass sheets, including a furnace for heating the glass sheets to softening temperature, shaping means for curving the heated glass sheets, and means for tempering the curved sheets arranged in tandum. The glass sheet shaping means includes upper and lower complemental pressing units, and a series of relatively narrow endless belts for receiving the glass sheets from the furnace, positioning them between the pressing units for curving and for subsequently delivering the curved sheets to the tempering means. The shaping means also includes means automatically operable to relieve the tension on the endless belts to bring the travel of the glass sheets to a stop between the pressing units during pressing and to reestablish the tension on said belts after pressing to deliver the curved sheets to the tempering means. The glass sheets are carried through the tempering means upon a series of horizontally spaced rolls, with the adjacent rolls being inclined to opposite directions to form a substantially V-shaped saddle for supporting the curved glass sheets.

10 Claims, 12 Drawing Figures

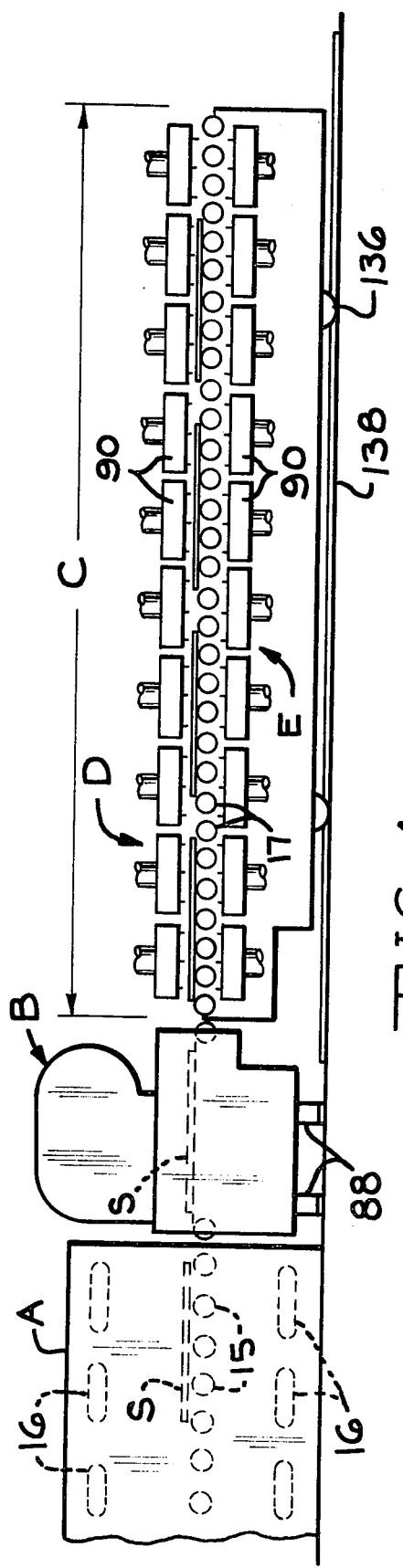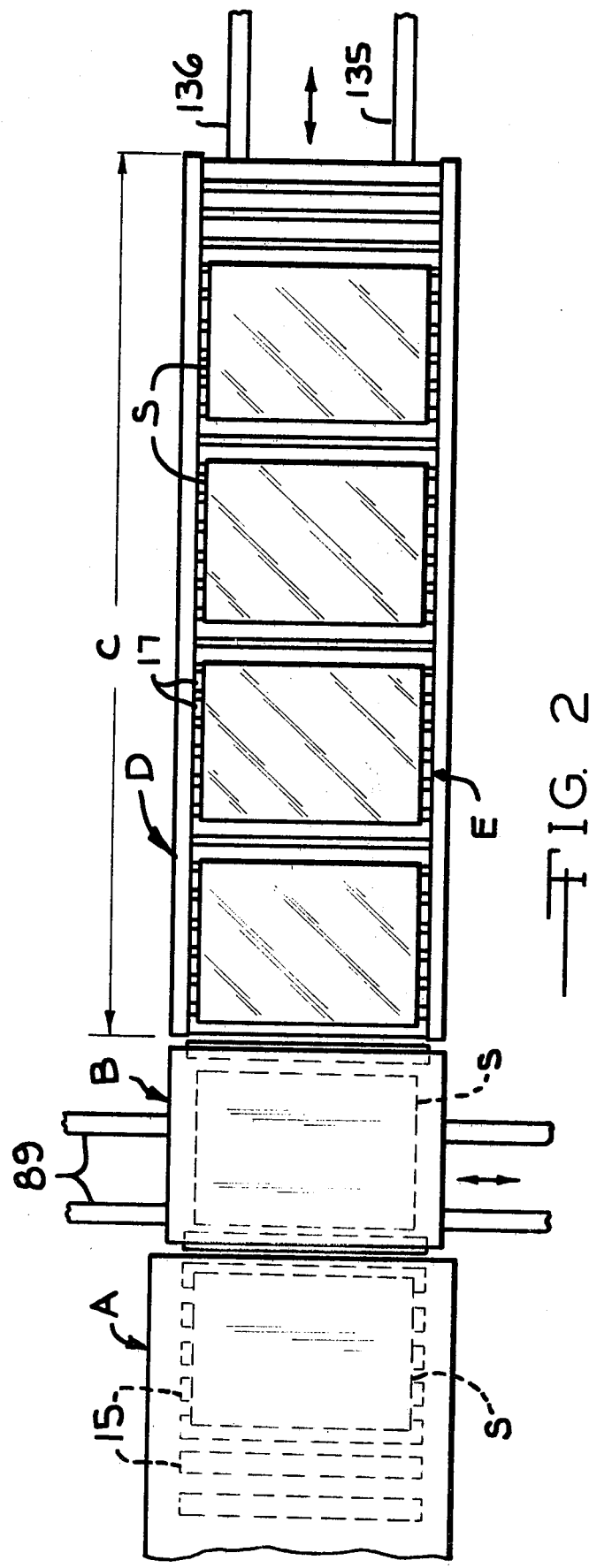

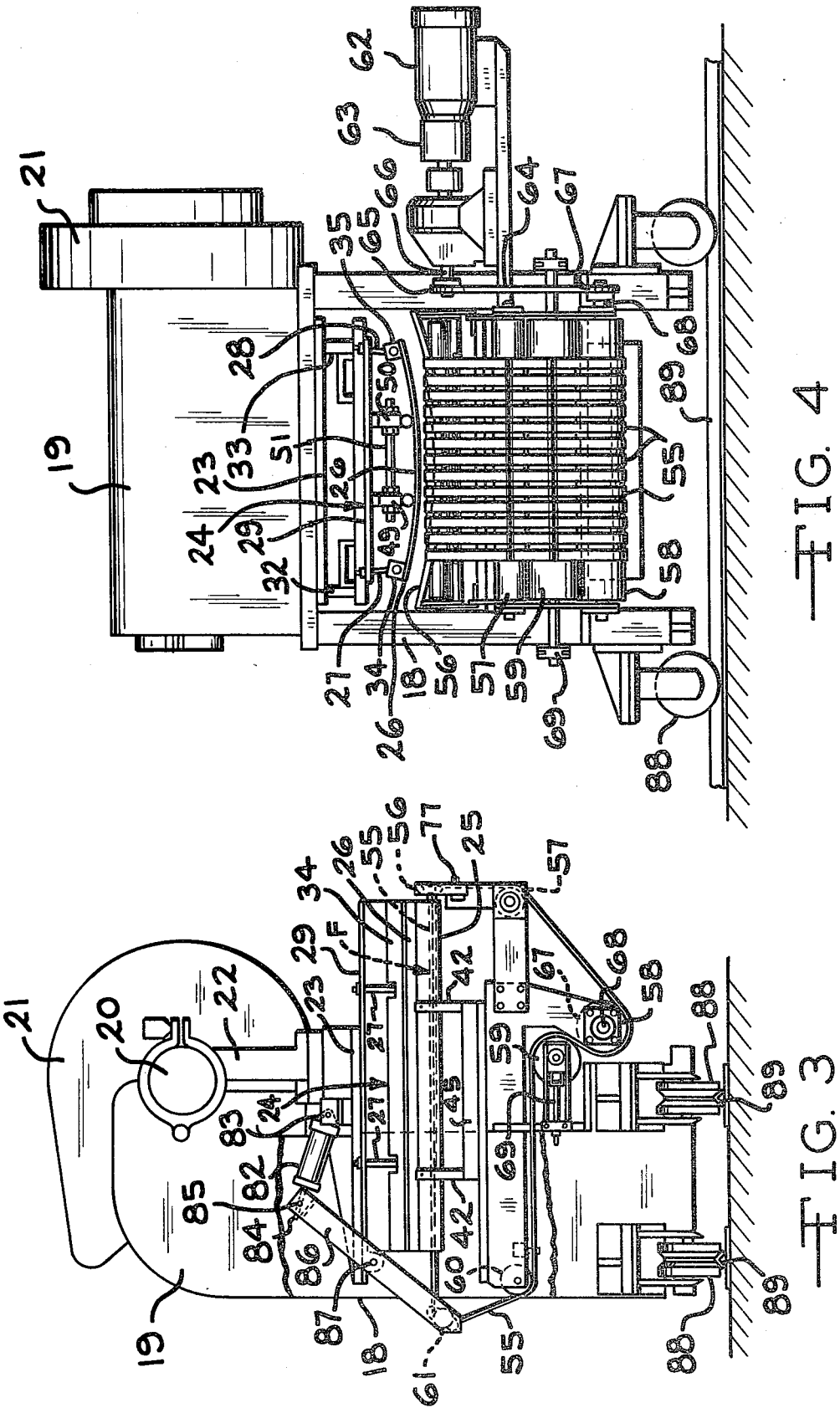

APPARATUS FOR CURVING AND TEMPERING GLASS SHEETS

FIELD OF THE INVENTION

The present invention relates to an improved apparatus for manufacturing glass sheets such as are used for automobile windows, sidelights and the like.

BACKGROUND OF THE INVENTION

The invention has particular utility for forming curved tempered glass sheets such as are currently used for automobile windows, and hence will be described in detail with reference thereto.

In recent years, there has been a greatly increased demand for automobile windows of relatively thin curved tempered glass. During this time, efforts have continued to produce, by various methods and means, thin curved tempered glass sheets of the highest quality to meet the ever increasing and exacting requirements of the automotive industry.

It is an object of this invention to provide apparatus whereby thin curved tempered glass sheets of exceptional high quality, possessing consistent accurately controlled curvatures, can be manufactured on a continuous high production basis at relatively low cost and with minimum breakage or scrap losses.

These, along with other objects, features and advantages of the invention will appear more clearly from the following description of a preferred embodiment thereof, with reference to the accompanying drawings.

BRIEF DESCRIPTION OF THE DRAWINGS

FIG. 1 is a longitudinal side view of apparatus provided by the present invention, FIG. 2 is a plan view thereof, FIG. 3 is a side view the pressing means constructed in accordance with the invention, FIG. 4 is a front view thereof.

DETAILED DESCRIPTION

Figure 5:
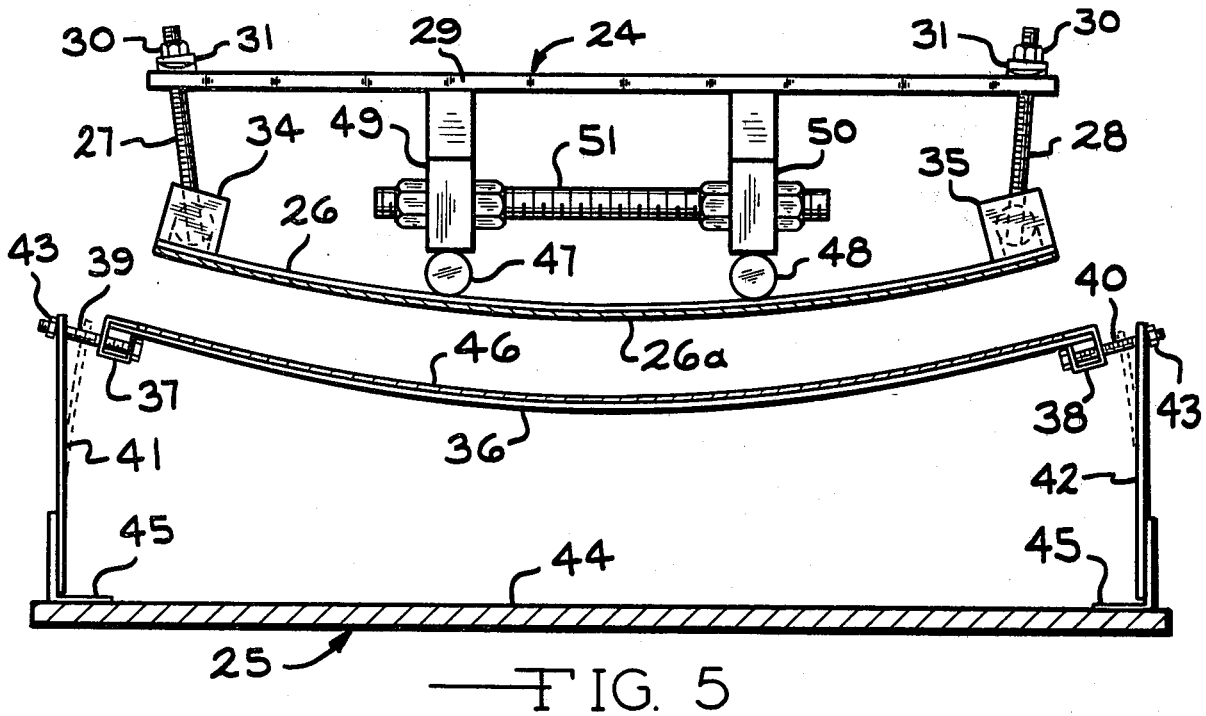
FIG. 5 is a front elevation of the upper and lower pressing units.

Referring to the drawings and particularly to FIGS. 1 and 2, the glass sheet curving and tempering apparatus of this invention includes generally an elongated furnace A in which the glass sheets S, after bring cut to size, are heated to the softening point of the glass, a curving or shaping press B for receiving the heated glass sheets from the furnace, and a tempering or quenching section C for receiving the curved glass sheets from the shaping press and for rapidly chilling the glass sheets to establish a permanent stress pattern therein.

The glass sheets S are transported horizontally through the furnace A by any suitable conveyor means such as the rolls 15. The furnace can be heated in any conventional manner as by gas fired radiant heating tubes 16. Upon issuing from the furnace the heated glass sheets move to the curving or shaping press B and then into the tempering section C where the curved glass sheets are received and carried forwardly upon a series of spaced horizontal conveyor rolls 17 located between the upper and lower blast heads D and E. The tempered glass sheets are then delivered from the quenching section onto a series of carry-out rolls (not shown) where the sheets are cooled and removed.

The shaping press B is a quick-acting type punch press and is adapted to receive successive glass sheets from the furnace and, after shaping, to deliver them to the blastheads D and E on a high speed production basis.

Referring particularly to FIGS. 3 and 4, the shaping press B comprises the usual body structure 18, motor 19 for driving a crank shaft 20 connected to a fly wheel 21. The crank shaft operates a vertically movable ram 22 to which is secured a horizontal base plate 23.

According to the invention, the press is provided with upper and lower pressing units 24 and 25 (FIG. 5) for curving or shaping therebetween the glass sheets received from the furnace. The upper shaping unit 24 comprises a substantially rectangular metal plate 26 which is bent transversely to provide a bottom convex shaping surface of a curvature to be imparted to the glass sheets. Covering this surface is a sheet 26a of cushioning material such as fiber glass cloth.

The pressing plate 26 is supported at its opposite sides by spaced substantially vertical bolts 27 and 28 which pass upwardly through a horizontal bolster plate 29 and are secured thereto by nuts 30 beneath which are located spherical washers 31. The bolster plate 29 is hung from the horizontal base plate 23 by hangers 32 and 33 (FIG. 4). The lower ends of the bolts 27 and 28 are secured in elongated bars 34 and 35 respectively.

The lower shaping unit 25 comprises a substantially rectangular metal plate 36 having an upper concave curvature complementary to the convex curvature of the upper shaping plate 26. The shaping plate 36 is secured at its opposite sides to spaced clamps 37 and 38 attached by bolts 39 and 40 to flexible stanchions 41 and 42, said bolts passing through said stanchions and receiving thereon nuts 43. The stanchions are secured to a base plate 44 by angle brackets 45. The flexibility of the stanchions 41 and 42 will allow said stanchions to bend slightly inwardly toward one another upon contact of the upper pressing plate 26 with the glass sheets to cushion them against breakage. To assist in this cushioning effect, the upper surface of the pressing plate 36 is provided with a layer of fiber glass cloth 46, or the like.

To insure maintenance of the proper curvature of the upper pressing plate 26 during pressing of the glass sheets there is provided a back-up device for said plate. This back-up device may be of the type shown in either FIG. 5 or FIG. 6. In FIG. 5 it includes a pair of spaced parallel rods 47 and 48 arranged lengthwise of the pressing plate 26 substantially midway of the opposite sides thereof and secured to elongated bars 49 and 50. The bars 49 and 50 are supported from the bolster plate 29 and are connected together by spaced transverse bracing bolts 51.

Figure 6:
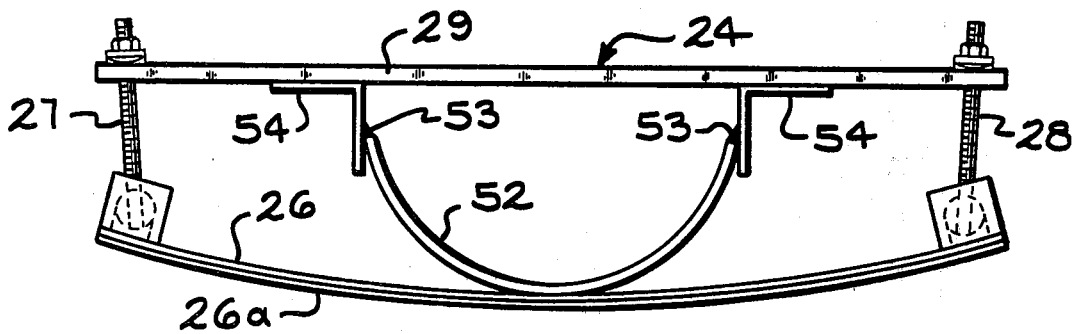
FIG. 6 is a modified form of lower pressing unit.

In FIG. 6, the back-up device consists of a semi-cylindrical plate 52 engaging the pressing plate 26 substantially midway of the opposite sides thereof and secured along its side edges as at 53 to angle brackets 54 secured to the bolster plate 29.

Upon leaving the furnace, the glass sheets S are received upon the horizontal flight F of a plurality of relatively narrow endless belts 55 arranged side-by-side in spaced parallel relation and which are adapted to position the glass sheets for pressing between the pressing units 24 and 25; and to subsequently deliver the curved glass sheets to the tempering section C. The horizontal flight of the endless belts travel over and in contact with the lower pressing member 36 and upon leaving said member pass downwardly over a stationary guide bar 56 which is concavely curved to correspond to the curvature of the lower pressing plate 36. The endless belts 55 continue downwardly around a guide roll 57, drive roll 58, belt tightening roll 59 and succeeding guide rolls 60 and 61 back into the horizontal flight.

The endless belts 55 are driven from a motor 62 through a gear reduction unit 63 and sprocket chain 64 trained about a sprocket 65 keyed to the shaft 66 of the gear reduction unit and also about a sprocket 67 keyed to the shaft 68 of drive roll 58. A belt tightening device 69 may be associated with the guide roll 59.

The guide bar 56 (FIGS. 7 and 8) is supported at its opposite ends by brackets 70 and 71 secured to plates 72 and 73 respectively. Positioned beneathe the guide bar 56 is a second guide bar 74 and secured thereto are a series of spaced belt guides 75 which consist of bolts passing through said guide bar and having threaded thereon nuts 76. The endless belts pass between the heads 77 of adjacent guide bolts 75 which prevent said belts from riding inwardly toward the center of the curved guide bar 56.

Figure 7:
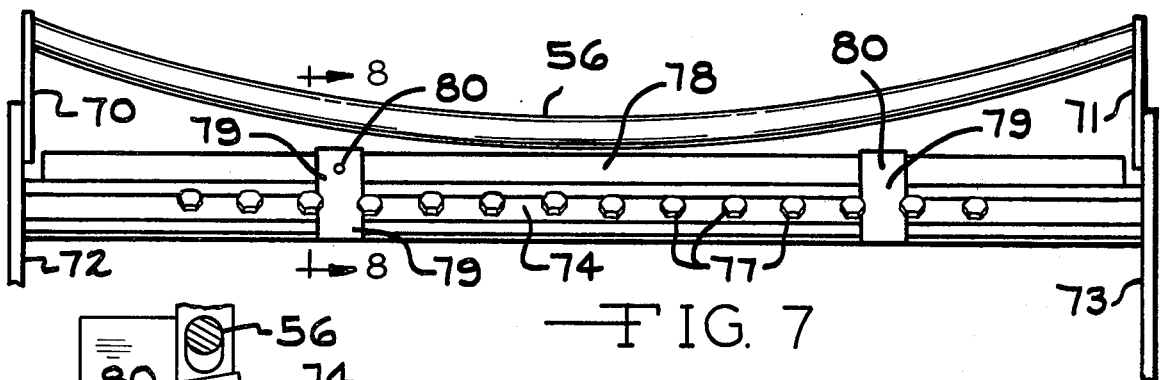
FIG. 7 is a front elevation of the guide means for the endless belts.
Figure 8:
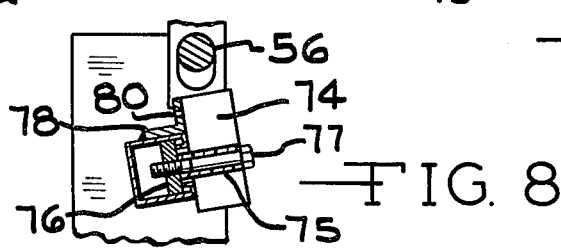
FIG. 8 is a detail section taken substantially on line 8—8 of FIG. 7.

Mounted directly above and parallel with the guide bar 74 is a third guide bar 78 to which are secured a series of spaced cushioning pads 79 over which the endless belts ride. These pads may be of any desired cushioning material, such as fiber glass, and are secured to the guide bar by screws 80. These pads are located between adjacent guide bolts 75 and while only two pads are shown in FIG. 7 it will be understood that one pad is provided for each endless belt 55.

During the actual pressing of the glass sheets or, otherwise stated, at the dwell point of the upper pressing unit 24, the glass sheets must be momentarily brought to a halt between the pressing units. To this end, there are provided at opposite sides of the press a pair of arms 86 (only one beign shown) which carry at their lower ends the guide roll 61 over which the endless belts travel as they enter their horizontal flight. The upper end of each arm 86 is pivoted, as at 85, to the piston rod 84 of a hydraulically operated piston 82 pivoted, as at 83, to the base plate 23.

In operation, as the ram 22 decends to press the glass sheets the upper ends of the arms 86 will be moved outwardly and the lower ends thereof, which carry the guide roll 61, moved inwardly about pivots 87. This will momentarily release the tension on the endless belts 55 allowing said belts to stop with the glass sheets in position for pressing. When the ram again moves upwardly the guide roll will be moved outwardly to again tighten the belts and cause resumption of travel thereof to effect delivery of the curved glass sheets into the tempering section.

The pressing means is preferably mounted upon wheels 88 which run on transverse rails 89 to permit the press to be moved outwardly of the furnace and tempering section for maintenance or repair.

TEMPERING SECTION

As stated above, the tempering section C comprises upper and lower blastheads D and E, with the curved glass sheets being carried therebetween upon a series of conveyor rolls 17. As shown in FIG. 1, each of the blastheads consists of a plurality of elongated parallel tubular members 90 extending transversely of the direction of travel of the glass sheets. Air or other gas for rapidly cooling the glass sheets is supplied to one or both ends of the tubular members from a suitable source and discharged therefrom against the upper and lower surfaces of the glass sheets through longitudinal slots or spaced orifices in the bottom wall of the upper tubular members and the top wall of the bottom tubular members. Since the specific construction and operation of the blastheads form no part of the present invention per se it is not believed that a more detailed illustration or description of them is necessary. However, for a more detailed disclosure of them reference is made to U.S. Pat. No. 4,138,241, issued Feb. 6, 1979.

Figure 9:
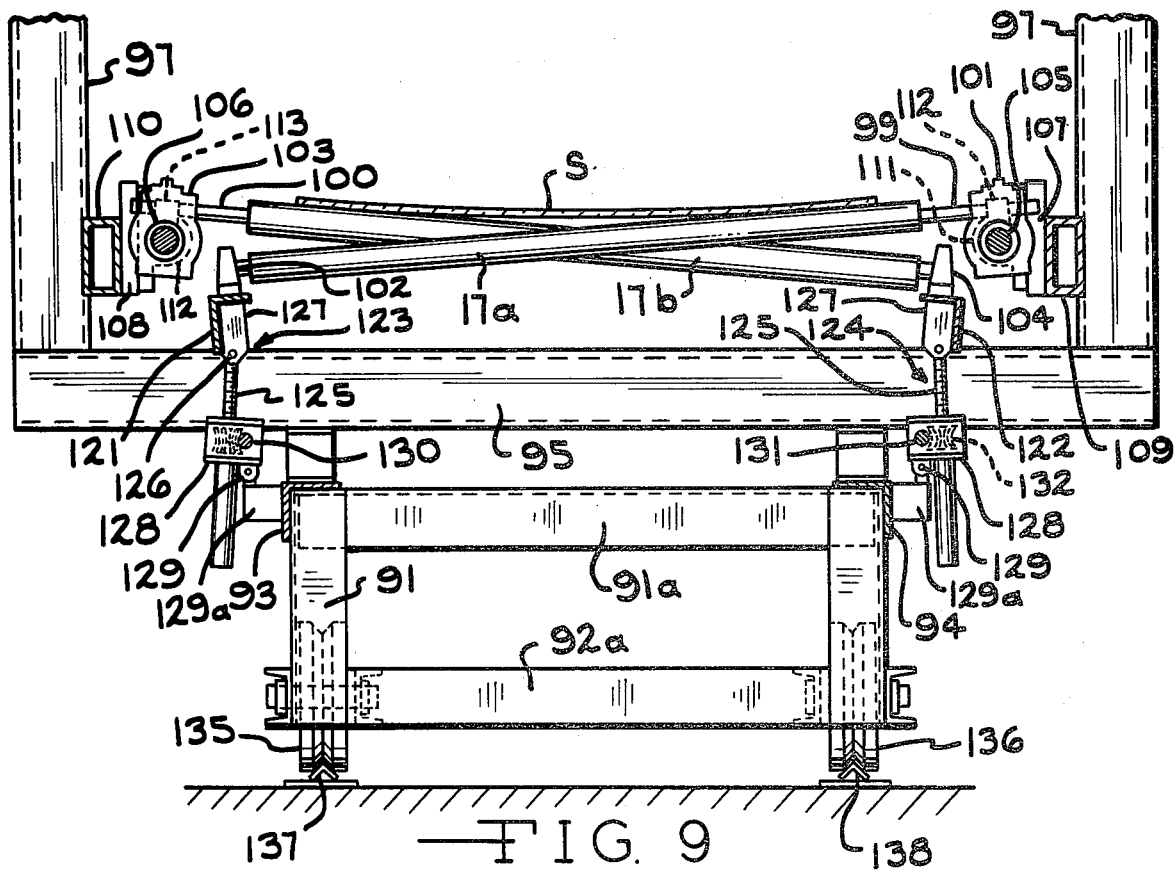
FIG. 9 is a transverse section through the tempering means showing the arrangement of the conveyor rolls for transporting curved glass sheets.

The conveyor rolls 17 are carried by a supporting framework shown in FIG. 9 which comprises a pair of vertical supporting posts 91 and 92 at each end of the roll conveyor joined by transverse upper and lower bracing members 91a and 92a. The posts 91 and 92 at opposite ends of the roll conveyor are connected together at their upper ends by the longitudinally extending angle beams 93 and 94 respectively.

Extending transversely of the roll conveyor and supported on the angle beams 93 and 94 are the horizontally spaced support members 95 and 96 secured at opposite ends to the uprights 97 and 98 which form a part of the support structure.

Referring particularly to FIG. 9, every other conveyor roll 17 are parallel with one another and incline in the same direction, while the alternate rolls are parallel with one another and incline in the opposite direction. Thus, adjacent rolls 17a and 17b cross one another at an angle with the result that there is provided a substantially V-shaped saddle for supporting the curved glass sheets S as they are carried forwardly by the rolls.

The conveyor rolls 17a and 17b are provided with shafts 99 and 100 respectively. The shaft 99 of roll 17a is journaled at one end in a gear box 101 at one side of the roll conveyor and at its opposite end in a pillow block 102. On the other hand, the shaft 100 of roll 17b is journaled at one end in a gear box 103 at the opposite side of the roll conveyor and at its other end in a pillow block 104.

Extending longitudinally of the roll conveyor at opposite sides thereof are the drive shafts 105 and 106 for the rolls 17, said shafts being supported in spaced bearing members 107 and 108 respectively. These bearing members are carried by the longitudinally extending tubular members 109 and 110 secured to the uprights 97 and 98. The shaft 105 passes through the gear boxes 101 and keyed to said shaft in each gear box is a worm gear 111 meshing with a worm 112 keyed to the adjacent end of the roll shaft 99. Likewise, the shaft 106 passes through the gear boxes 103 of rolls 17b and has keyed thereto in each gear box a worm gear 112 meshing with a worm 113 keyed to the adjacent end of roll shaft 100.

Figure 12:
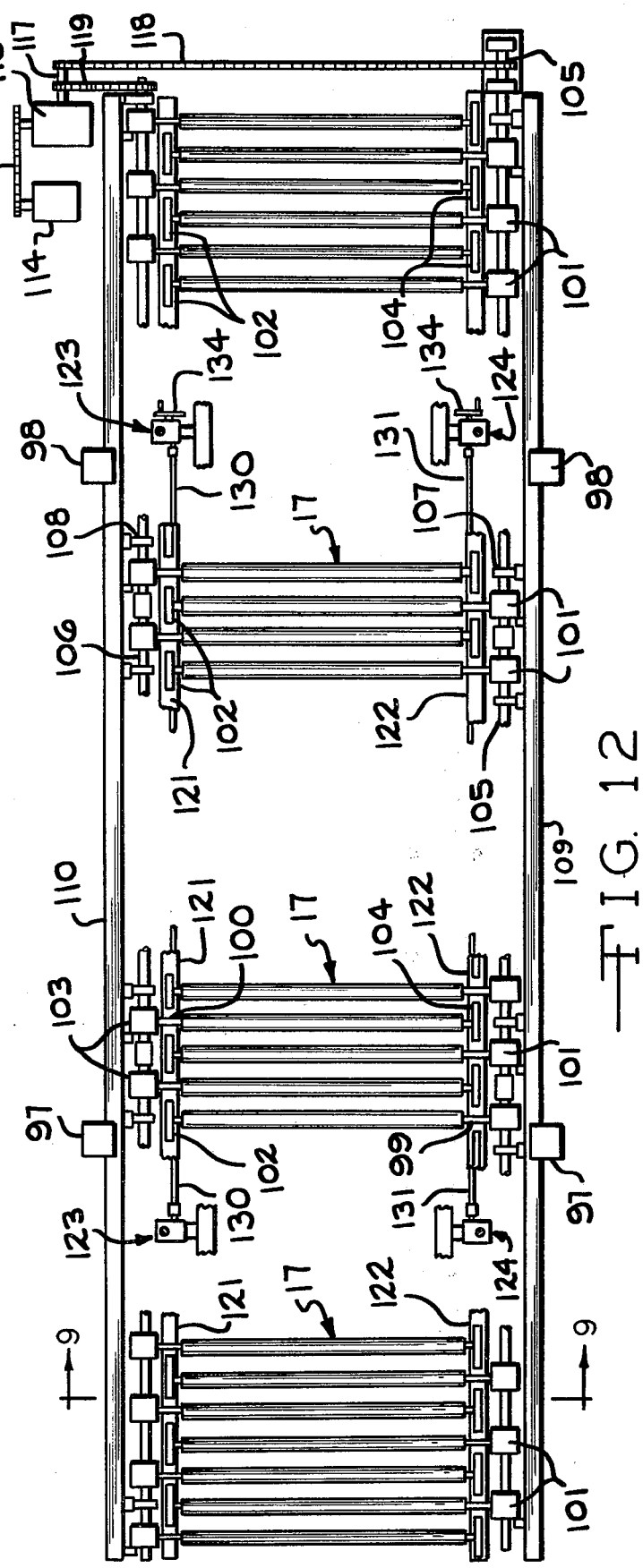
FIG. 12 is a top plan view of FIG. 11.

The shafts 105 and 106 are driven from a motor 114 (FIG. 12) by a sprocket chain 115 through a gear reduction unit 116. Keyed to the shaft 117 of gear reduction unit 116 are two sprockets. Trained about one of these sprockets is a sprocket chain 118 driving a sprocket keyed to the drive shaft 105, while a second sprocket chain 119 is trained about the other sprocket on shaft 117 and also about a sprocket on drive shaft 106. In this way, operation of the motor 114 will rotate the two shafts 105 and 106 and the conveyor rolls associated therewith.

The pillow blocks 102 and 104 in which the non-driven ends of the conveyor rolls 17a and 17b respectively are journaled are supported adjacent their opposite ends by jacks 123 and 124 respectively. Each jack includes a substantially vertical jack screw 125 pivoted at its upper end, as at 126, to a block 127 secured to the associated angle beam 121 or 122 and passing downwardly through a gear box 128 pivoted as at 129 to a bracket 129a on the supporting framework.

Extending longitudinally at opposite sides of the roll conveyor are shafts 130 and 131 journaled at their opposite ends in the associated gear boxes 128, each shaft having keyed thereto worm gears 132 meshing with worms 133 in said gear boxes 128. By means of a hand wheel 134 provided at one end of each shaft 130 and 131 the jacks 123 and 124 at opposite sides of the roll conveyor can be operated to move the related ends of the conveyor rolls 17a or 17b upwardly or downwardly to vary the angle of inclination thereof depending upon the curvature of the glass sheets.

The supporting framework is mounted on wheels 135 and 136 that run along rails 137 and 138 so that the roll conveyor can be moved as a unit toward or away from the pressing apparatus.

Although the apparatus herein provided is of particular utility in the pressing of initially flat sheets of glass to predetermined curvatures, it can be readily adapted to the curving or shaping of the softened glass sheets under their own weight without any downward pressing force. This is especially true when shaping the glass sheets to relatively shallow cylindrical curvatures.

When so desired, it is simply necessary to discontinue the operation of the upper pressing unit 24 and permit the softened glass sheets to be received from the furnace upon the endless belts 55 and carried thereby over the lower concave shaping member 36 and subsequently delivered to the tempering means. As the softened glass sheets move over the shaping member 36, they will be caused to sag under their own weight and assume the curvature of said shaping member.

Figure 10:
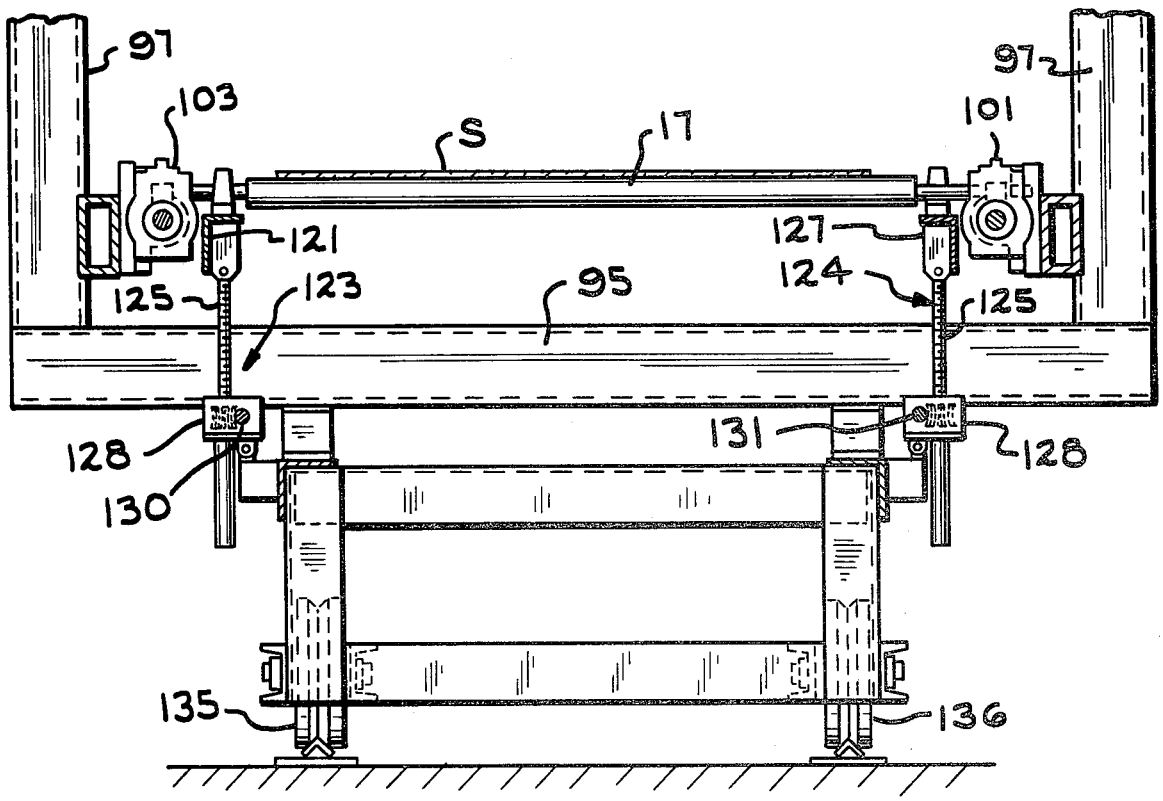
FIG. 10 is a similar view with the conveyor rolls in horizontally aligned position.
Figure 11:
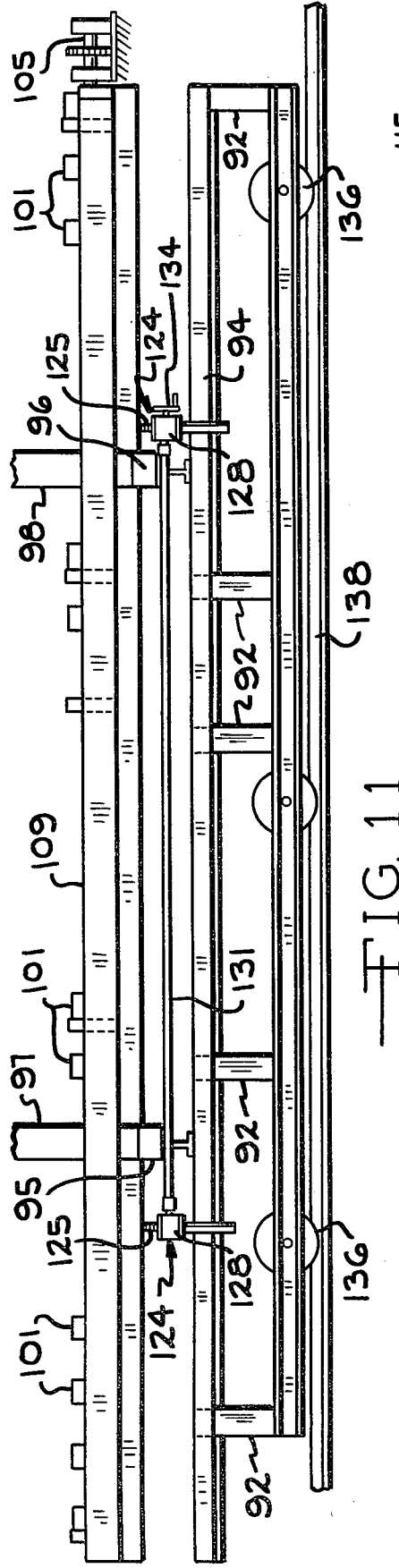
FIG. 11 is a longitudinal side view of the tempering means.

The apparatus can also be adapted to the tempering of flat sheets of glass. In this case, the conveyor rolls 17 of the tempering section are adjusted to a horizontally aligned position as indicated in FIG. 10 by the jacks 123 and 124, the upper and lower pressing units 24 and 25 removed and a flat support plate substituted for the lower pressing unit, with the horizontal flight F of the endless belts 55 traveling over and in contact with the flat support plate. The softened glass sheets, upon emerging from the furnace, will be received upon the endless belts and carried directly to the tempering means.

It is understood that various changes may be made from the specific illustrative embodiment without departing from the spirit of the invention as defined in the claimed subject matter that follows.

We claim:

1. Apparatus for producing curved tempered sheets of glass, including means for heating the glass sheets to softening temperature, means for receiving the softened sheets from said heating means and shaping them to the desired curvature, and means for receiving the curved sheets from the shaping means and for tempering the same, said shaping means comprising upper and lower shaping members, and a plurality of relatively narrow endless belts arranged in spaced parallel relation and having a substantially horizontal flight for conveying the glass sheets between the shaping members, said lower shaping member having an upper concavely curved shaping surface of a length and width at least equal to those of the glass sheets, with the curvature of said shaping surface being disposed transversely to the line of movement of said belts and the said belts passing over and in contact therewith, means for lowering and raising the upper shaping member, and means for driving said endless belts for receiving the softened glass sheets from the heating means, carrying them over the said shaping surface and subsequently delivering the curved glass sheets to the tempering means.

2. Apparatus for producing curved tempered sheets of glass as claimed in claim 1, including a horizontal guide member concavely curved to correspond to the curvature of the shaping surface and over which the endless belts pass upon upon leaving said shaping surface, and means on said guide member for preventing said belts from riding inwardly toward the center of said shaping surface.

3. Apparatus for producing curved tempered sheets of glass as claimed in claim 1 including means responsive to movement of the means for lowering and raising the upper shaping member, for releasing the tension on the belts to bring said belts to a halt during the shaping of the glass sheets and for re-establishing the tension on the belts after shaping to effect transfer of said sheets to the tempering means.

4. Apparatus for producing curved tempered sheets of glass as claimed in claim 3, in which said last-named means includes a horizontal guide roll over which the endless belts pass upon entering their horizontal flight, and means connected to said guide roll and to the means for lowering and raising the upper shaping member and actuated by the latter for moving said guide roll in one direction to release the tension on the belts to bring said belts to a halt during shaping of the glass sheets and in the opposite direction to re-establish the tension on the belts after shaping to effect transfer of the curved glass sheets to the tempering means.

5. Apparatus for producing curved tempered sheets of glass including means for heating the glass sheets to softening temperature, means for receiving the softened glass sheets from said heating means and shaping them to the desired curvature, and means for receiving the curved sheets from the shaping means and for tempering the same, said shaping means comprising upper and lower complemental shaping members, a plurality of relatively narrow endless belts arranged in spaced parallel relation and having a substantially horizontal flight passing over and in contact with the lower shaping member, means for lowering the upper shaping member into shaping position and for, then raising it to inoperative position, a horizontal guide roll over which the endless belts pass upon entering their horizontal flight, a pair of spaced arms carrying said guide roll at their lower ends, means for pivotally connecting said arms at their upper ends to the means for lowering and raising said upper shaping member, and means for pivotally mounting said arms intermediate their ends such that when the upper shaping member is lowered the guide roll will be moved inwardly to release the tension on the belts to bring said belts to a halt during shaping of the glass sheets and upon return of the shaping member to its inoperative position will re-establish tension on the said belts to effect transfer of the curved glass sheets to the tempering means.

6. Apparatus for producing curved tempered sheets of glass, including means for heating the glass sheets to softening temperature, means for receiving the softened sheets from said heating means and shaping them to the desired curvature, and means for receiving the curved sheets from said shaping means and for tempering the same, said tempering means comprising a plurality of horizontally arranged conveyor rolls, and means for mounting said rolls such that adjacent rolls cross one another at an angle intermediate their ends to provide a substantially V-shaped saddle for supporting the curved glass sheets.

7. Apparatus for producing curved tempered sheets of glass as claimed in claim 6, including means for driving said conveyor rolls from one end thereof, and means for supporting the opposite end of the rolls for free rotation.

8. Apparatus for producing curved tempered sheets of glass as claimed in claim 7, including means for supporting the non-driven ends of said rolls and for adjusting said ends vertically.

9. Apparatus for producing curved tempered sheets of glass as claimed in claim 8, in which said means includes individual jacks associated with the non-driven ends of the rolls, and means for operating said jacks simultanesously to raise or lower the non-driven ends of said rolls.

10. Apparatus for producing curved tempered sheets of glass as claimed in claim 1, in which the lower shaping member comprises a concavely curved shaping plate, and including means supporting said shaping plate at its opposite sides including vertical support members fixed at their lower ends and connected at their upper ends to said shaping plate, said support members being flexible such that they will bend inwardly toward one another upon contact of the upper shaping member with the glass sheets to cushion said sheets against breakage.

* * * * *